United States Patent [19]

Sunohara et al.

[11] 4,369,865
[45] Jan. 25, 1983

[54] LOCK-UP CONTROL SYSTEM FOR A TORQUE CONVERTER

[75] Inventors: Yoshio Sunohara; Kunio Ohtsuka, both of Yokohama, Japan

[73] Assignee: Nissan Motor Company, Limited, Yokohama, Japan

[21] Appl. No.: 23,471

[22] Filed: Mar. 23, 1979

[30] Foreign Application Priority Data

Apr. 4, 1978 [JP] Japan .................... 53/38851

[51] Int. Cl.³ .............................................. F16H 47/00
[52] U.S. Cl. ..................................... 192/3.31; 74/731
[58] Field of Search ................. 192/3.31, 3.3, 3.29, 192/3.28; 74/731

[56] References Cited

U.S. PATENT DOCUMENTS

| | | | |
|---|---|---|---|
| 3,068,974 | 12/1962 | Jandasek | 192/3.31 X |
| 3,126,988 | 3/1964 | Memmer | 192/3.3 X |
| 3,566,998 | 3/1971 | Honda | 192/3.31 X |
| 3,693,478 | 9/1972 | Malloy | 192/3.3 X |
| 3,810,531 | 5/1974 | Edmunds | 192/3.3 |
| 3,977,502 | 8/1976 | Chana | 192/3.31 X |

FOREIGN PATENT DOCUMENTS 746297 3/1956 United Kingdom .
1447324 8/1976 United Kingdom .
1483032 8/1977 United Kingdom .

OTHER PUBLICATIONS

Automotive Engineering, Nov. 1977, pp. 28–30.

Primary Examiner—Thomas F. Callaghan
Attorney, Agent, or Firm—Schwartz, Jeffery, Schwaab, Mack, Blumenthal & Koch

[57] ABSTRACT

A control system is provided wherein lock-up operation of a torque converter is effected only when the vehicle speed exceeds a certain level even if the associated transmission is shifted into a predetermined speed.

7 Claims, 7 Drawing Figures

LOCK-UP CONTROL SYSTEM FOR A TORQUE CONVERTER

BACKGROUND OF THE INVENTION

The present invention relates to a lock-up control system for a torque converter of an automatic transmission for a vehicle.

Automatic transmissions including or equipped with a torque converter having a disadvantage that since there is a slip within the torque converter between the pump impeller and turbine runner even when the vehicle runs at high speeds when the torque duplication by the torque converter is not required, a loss in power transmission under this vehicle operating condition is noticeable, resulting in the poor fuel economy of the vehicle.

In order to improve the fuel economy of the vehicles having an automatic transmission of the above mentioned type, it is known to provide a lock-up mechanism, such as a direct drive clutch, within the torque converter so as to selectively engage to provide a direct drive connection between the pump impeller and turbine runner for the purpose of preventing the occurrence of the slip.

The conventional lock-up control systems are such that the lock-up mechanism is shifted into the engaged condition to provide the direct drive connection between the pump impeller and turbine runner upon a shift is made into a predetermined speed in the automatic transmission.

A known torque converter, wherein the lock-up takes place when the transmission shifts to the third speed, has defects in that the acceleration becomes poor, particularly in a vehicle of a smaller engine output, and that unpleasant vibration and noise are produced, because the lock-up takes place when the transmission may shift to the third speed even within a low load driving range and also during a low vehicle speed, thereby the acceleration from a low speed should take place with the pump impeller and turbine runner being kept in a direct connection.

SUMMARY OF THE INVENTION

According to the present invention, there is provided, in addition to a first, lock-up control, valve, a second valve communicating with a source of pressurized fluid that is indicative of the vehicle speed so that the vehicle driving condition where a torque converter will lock is optimized.

An object of the present invention is to provide in an automatic transmission for a vehicle, the automatic transmission having at least two forward gear ratios and including a torque converter with a lock-up mechanism including a lock-up chamber, a source of a first pressurized fluid, a passageway communicable with the source of the first pressurized fluid to be pressurized when a predetermined one of the two forward gear ratios is selected, and a source of a second pressurized fluid indicative of the vehicle speed: a hydraulic control system for the torque converter comprising; a first valve communicating with the passageway and with the source of the second pressurized fluid; and a second valve communicating with the lock-up chamber for controlling pressure within the chamber said first valve communicating with the second valve to urge the latter into a predetermined position in response to pressures in the passageway and of the second pressurized fluid whereby when the first valve is in said predetermined position, the lock-up torque converter will lock up.

DESCRIPTION OF THE PREFERRED EMBODIMENT

Figure 1:
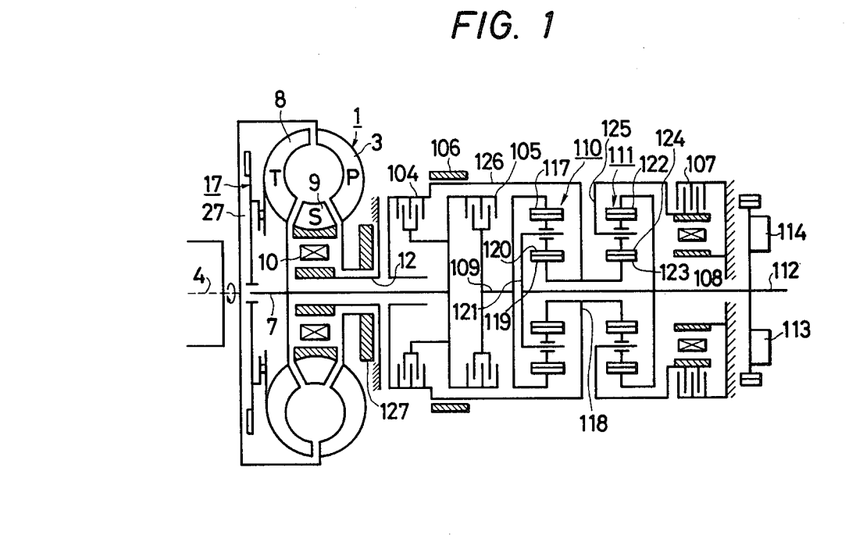
FIG. 1 is a schematic view showing the construction of a mechanical portion of an automatic transmission equipped with a converter including a lock-up mechanism.

FIG. 1 shows the structure of the power transmitting part in a 3-forward speed, 1-reverse speed automatic transmission with a torque converter, which comprises a crank shaft 4 to be driven by a prime mover, an engine, a torque converter 1 having a lock-up mechanism 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller P, a turbine runner T, and a stator S, in which the pump impeller P is driven by the crank shaft 4 to circulate the torque converter operation oil therein so as to transmit torque to the turbine runner T fixed on the input shaft 7. The torque is further transmitted by the input shaft 7 to a change-speed planetary gearing. The stator S is disposed on a sleeve 12 through a one-way clutch 10, the one-way clutch allowing the stator S to rotate in the same direction as the crank shaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, whereas the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be drive by the turbine runner T to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this case, only the rear clutch 105, a forward clutch, is in engaged condition. The power output of the engine via the torque converter 1 is transmitted by the input shaft 7 and rear clutch 105 to the inwardly toothed gear 117 of the first planetary gear unit 110. This rotation of the inwardly toothed gear 117 will cause the planetary gears 120 to rotate forwardly. Accordingly, the sun gear 119 rotates reversely, and, since the sun gear 123 of the second planetary gear unit 111 which is rotatable with the sun gear 119 rotates reversely, the planetary gears 124 of the second planetary gear unit 111 rotates forwardly. The one-way brake 108 works as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby the first forward gear ratio being established.

If, in this state, the vehicle increases enough to cause the application of the second brake 106, the power flow path through the input shaft 7 and rear clutch 105 up to the inwardly toothed gear 117 is the same as that for the first forward speed. The second brake 106 works as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate with a faster speed than in case of the first speed although with a certain reduction ratio, thereby the second forward gear ratio being established.

If the vehicle speed further increases so as to causes the second brake 106 to be released and, in lieu thereof, the front clutch 104 to be engaged, the power on the input shaft 7 is transmitted partially through the rear clutch 105 to the inwardly toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotation speed, thereby the third forward gear ratio being established. In this case, the input is fed to both the front clutch 104 and rear clutch 105 and the torque increase is not carried out by the planetary gears so that none works as a reaction brake in this state.

The planetary gearing arrangement illustrated in and described in connection with FIG. 1 is similar in construction to the planetary gearing arrangement disclosed in U.S. Pat. No. 2,856,794, issued to H. W. Simpson, on Oct. 21, 1958, and reference thereto may be made for a more complete description of the construction and operation of the transmission.

Figure 2A:
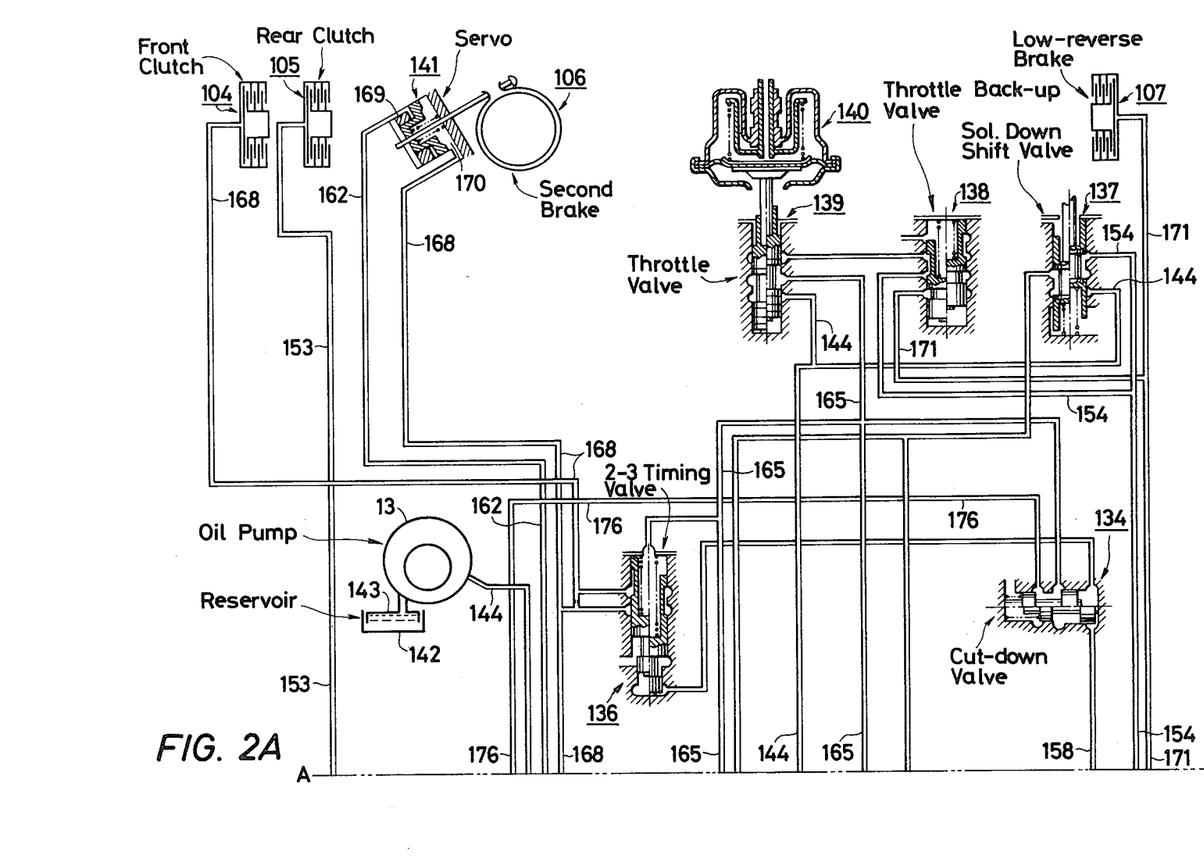
FIGS. 2A and 2B, when combined, are a schematic view showing a hydraulic control system including a lock-up control system according to the present invention for the automatic transmission mechanism shown in FIG. 1.
Figure 2B:
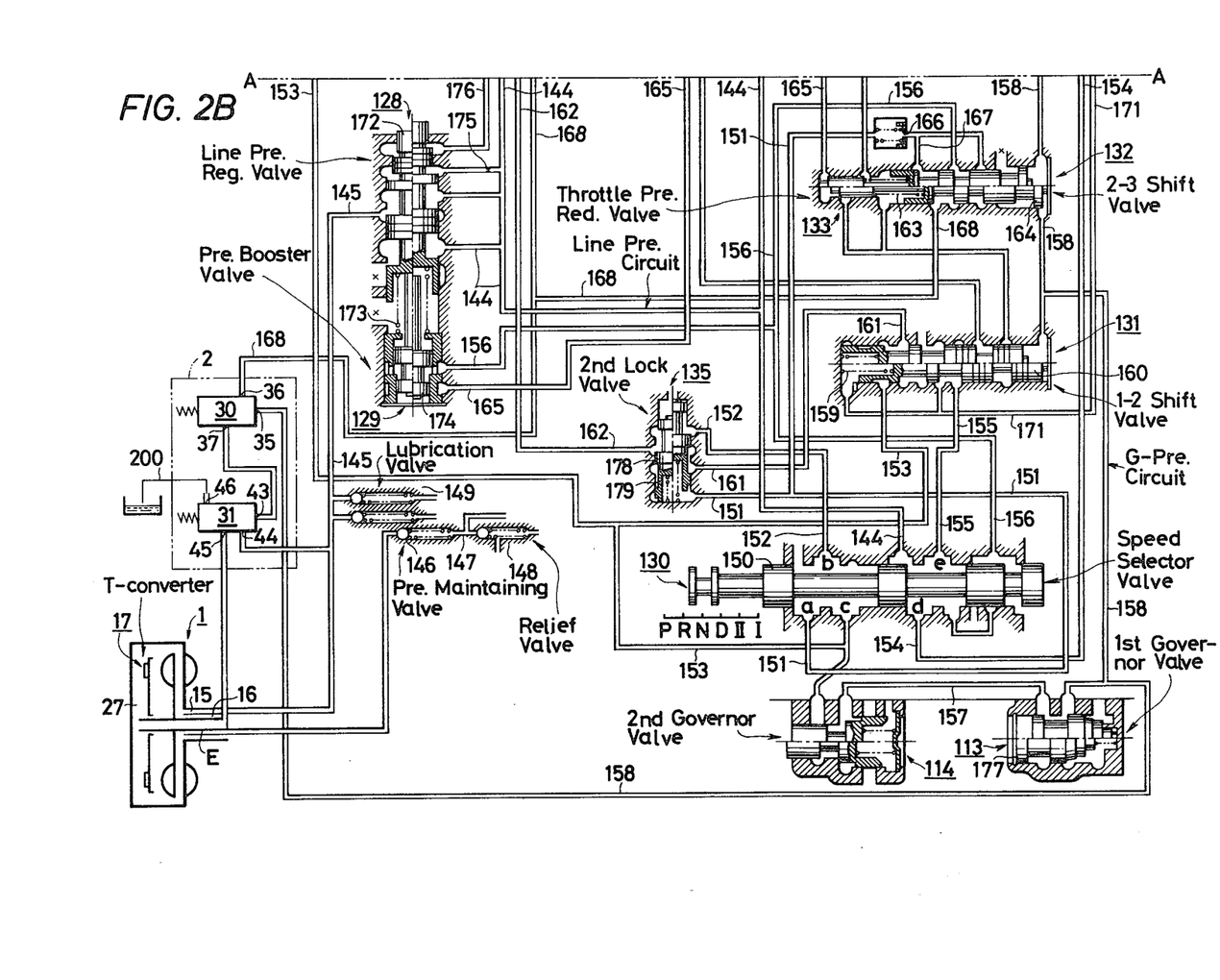

FIGS. 2A and 2B show a hydraulic control system of the above-described change speed transmission, which control system comprises an oil pump 13, a line pressure regulator valve 128, a pressure booster valve 129, a torque converter 1, a speed selector valve 130, a first governor valve 113, a second governor valve 114, a 1–2 shift valve 131, a 2–3 shift valve 132, a throttle pressure reducing valve 133, a cut-down valve 134, a second lock valve 135, a 2–3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prim mover through the driving shaft 14 and the pump impeller P of the torque converter 1 for suctioning oil from a reservoir 142 through a strainer 143, where harmful dust is removed, during the whole operating conditions of the prime mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubricaion valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions will cause the spool 150 to change the passage of the line pressure circuit 144. FIG. 2 shows a condition of the speed selector valve when the spool takes up the N (neutral) position, wherein the line pressure circuit 144 is permitted to communicate with to ports d and e.

The first and second governor valves 113 and 114 are in operative condition to produce a governor pressure while the automobile is running forwardly. When the speed selector valve 130 assumes either D, II or I position, the oil pressure is fed from the line pressure circuit 144 to the second governor valve 114 through the port c of the speed selector valve 130. If under this condition the automobile begins to run, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 161 and a circuit 162, up to an apply side oil pressure chamber 169 of the servo 141 for the second brake 106, the 1-2 shift valve 131 and second lock valve 35 are separately arranged, and a circuit 152 leads from the port b of the speed selector valve 130 to the second lock-up valve 135.

If the speed selector lever is moved to the D position, the spool 150 of the speed selector valve 130 is moved to a position providing communicating between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly with a spring 179 and will be urged downwardly with the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being provided.

When, under this condition, the vehicle speed increases up to a certain level the governor pressure in the circuit 158 urges the spool 160 of the 1-2 shift valve 131, which is urged to the right by the spring 159, to move to the left, for effecting an upshift from the first forward speed to the second forward speed, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

Since the 1-2 shift valve 131 in this control system is minimized, the spool 160 highly responsive to effect movement to the left with the necessary speed, so that the vehicle speed at which the upshift is made does not move toward the higher vehicle speed side from the designed speed level.

When the vehicle speed further increases up to another certain level, the governor pressure in the circuit 158 urges to press the spool 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus the third forward gear ratio condition is established.

If the speed selector level is moved to the II position, the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither the release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging to press the spool 160 to the right in cooperation with the spring 159, thereby locking the transmission in the first forward speed once a downshift is made thereto.

Figure 3:
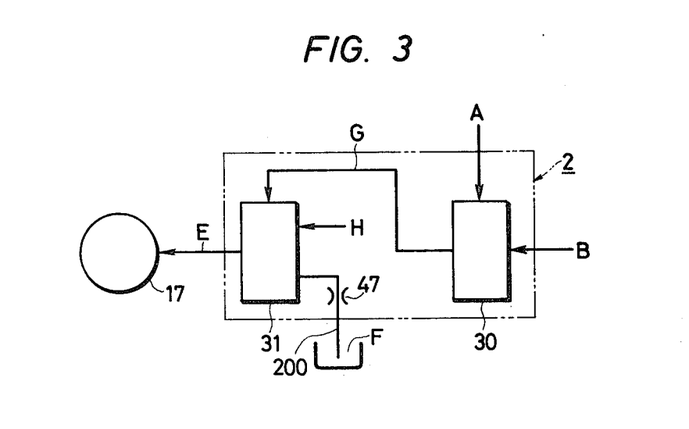
FIG. 3 is a block diagram explaining the flow of control signals in the lock-up control system.

FIG. 3 is a block diagram showing the oil flow in the lock-up control system according to the present invention, wherein the first spool valve 30, receives, as an input, the pressure signal B which appears when the transmission has been shifted to a predetermined shift position or positions and also receives governor pressure A so as to provide, as an output, another signal, for example, a signal G in response to the pressure B and the pressure A, and the second spool valve 31 ceases to feed the converter operating oil pressure H to the lock-up oil passage E and establishes communication of the lock-up oil passage E with the reservoir F through a flow restrictor 47 in response to the signal G so as to effect lock-up condition of the torque converter.

Figure 4A:
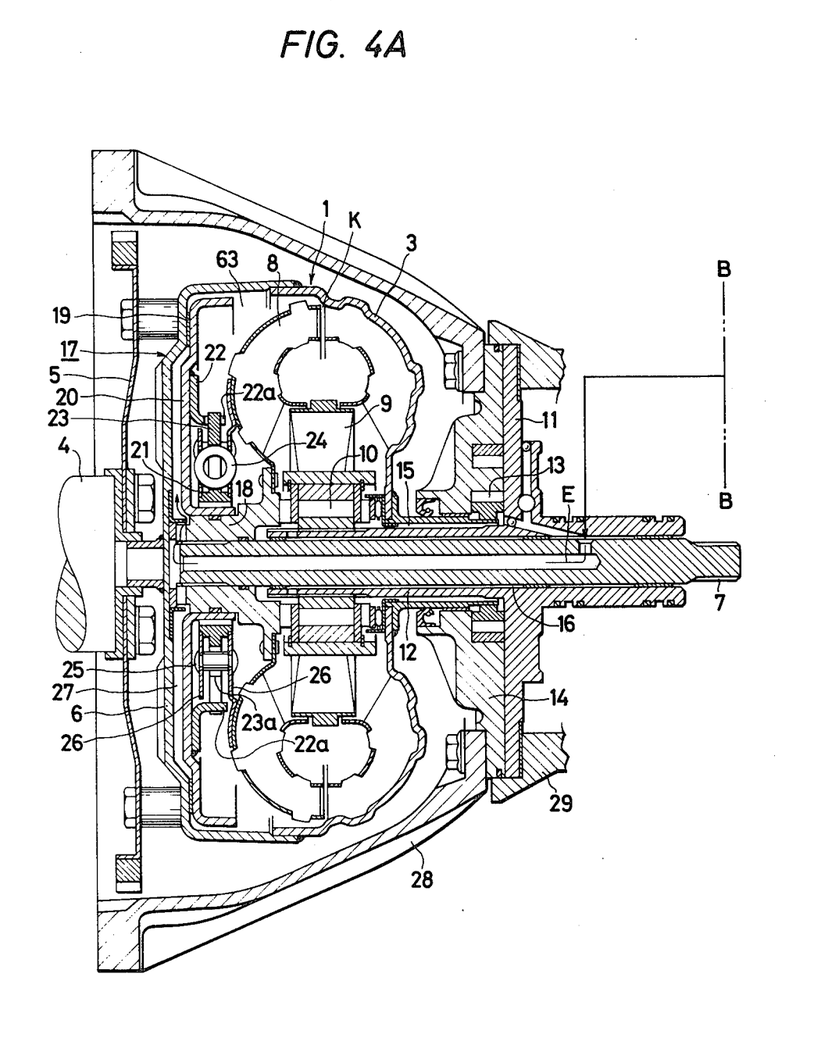
FIGS. 4A and 4B, when combined, are a sectional diagram showing the structure of the lock-up mechanism of the torque converter and the valves used in the lock-up control system.
Figure 4B:
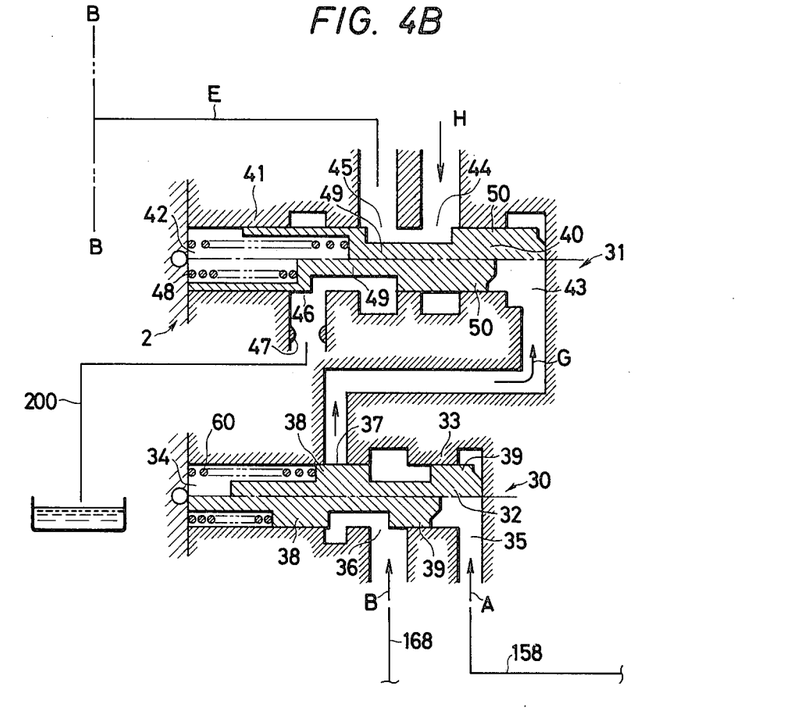

Referring to FIGS. 4A and 4B, the preferred embodiment just mentioned in connection with FIG. 3 will be described hereinafter.

In the torque converter 1, the pump impeller 3 is connected to the crank shaft 4 of the engine (not shown) through the drive plate 5 and the converter cover 6, the turbine runner 8 is splined to the input shaft 7 which has a lock-up oil passage E formed through the central portion thereof, and the stator 9 is mounted through the one-way clutch 10 to the stationary sleeve shaft 12 integral with an oil pump cover 11.

An oil pump 13 is arranged in an oil pump housing 14. The oil discharged from the oil pump 13, after its pressure is appropriately regulated by the line pressure regulator valve 128 shown in FIG. 2, flows, as the torque converter operating oil, through the oil passages 145 and 15 into the inside of the converter 1, and then circulates between the pump impeller 3, turbine runner 8 and stator 9. Partially, the oil flows out of the converter and through the oil passage 16 and back to a reservoir F after it is cooled by a cooler and after it is used for lubricating the rear lubricating part.

A lock-up mechanism 17 comprises, on a turbine hub 18, a clutch piston 20 which is capable of moving toward and away from the converter cover 6 and which is engageable with the converter cover 6 through a clutch facing 19, and a torsional damper 21 engaged by the clutch piston 20 and fixed to the turbine runner 8.

The clutch pison 20 is shaped generally as a saucer with a recess opening toward the crank shaft 4, and is non-rotatably connected to the turbine runner 8 and is axially slidably connected to the latter. An annular connecting member 22 fixed to the intermediate portion of the clutch piston 20 is formed with projecting portions 22a engaging in grooves 23a formed in a drive plate 23 of the torsional damper 21 and the adjacent one of two driven plates 26, which are connected to the drive plate 23 through torsional springs 24 and pins 25, is fixed to the turbine runner 8. The reference numeral 27 designates a lock-up oil chamber formed between the converter cover 6 and clutch piston 20, the chamber 27 communicating with the lock-up oil passage E which permits an increase or decrease in pressure within the lock-up oil chamber 27 under the control of the lock-up control system in such a manner as will be described later, thereby controllably actuating the clutch piston 20. The reference numeral 28 designates a coverter housing and 29 a transmission case.

The lock-up control system 2 connected to the lock-up chamber 27 through the oil passage E includes the first spool valve 30 and second spool valve 31.

The first spool valve 30 comprises a spool 32 (in FIG. 4B the upper and lower halves thereof are shown with the phase displaced) and a valve body 33, the valve body 33 having a bore 34 for slidably receiving the spool 32, an inlet port 35 connected to the circuit 158 for receiving the governor pressure A to apply this pressure to the right end surface of the spool 32, an inlet port 36 connected to the circuit 168 for receiving the front clutch pressure B, and an outlet port 37 for supplying the actuating signal G to the second spool valve 31.

When the governor pressure A is within the range lower than a predetermined level, the spool 32, under the action of a spring, is pressed against the end wall adjacent the inlet port 35 (the spool 32 is in the illustrated position as in the upper half in FIG. 4) and in this position a land 38 of the spool interrupts the communication between the inlet port 36 and outlet port 37. A land 39 of the spool constantly prevents the communication between the inlet port 35 and inlet port 36.

The second spool valve 31 comprises a spool 40 (the upper and lower halves thereof are shown with the phase displaced as in the case of the spool 32) and a valve body 41. The valve body 41 has a bore 42 for slidably receiving the spool 40, an inlet port 43 for receiving the actuation signal G from the port 37 of the first spool valve 30 to apply this pressure to the right end surface of the spool 40, an inlet port 44 for receiving the converter operating oil pressure H which is fed from the oil pump 13 through the line pressure regulator valve 128 and circuit 145, a port 45 communicating with the lock-up oil passage E, and a port 46 communicating with the reservoir F shown in FIG. 3. Within the oil passage connecting the port 46 to reservoir F, a flow restrictor 47, such as an orifice, is provided for controlling the reducing speed of the pressure within the lock-up oil chamber 27 in such a manner as will be described later.

The spool 40 is pressed to the end wall adjacent the inlet port 43 by a spring 48. The second spool 40 has a smaller diameter section 49 which provides communication between the ports 44 and 45 when the spool is in the illustrated position as in the upper half in FIG. 4, and has a land 50 constantly preventing the communication between the ports 43 and 44. When the spool 40 is moved to the left in the drawing as a result of the supply of the pressure G (the spool 40 being in the illustrated position as in the lower half in FIG. 4), the smaller diameter section 49 provides communication between the ports 45 and 46 and the land 50 interrupts communication between the port 45 and port 44.

In the thus constructed lock-up control system 2, the first spool valve 30 activates the second spool valve 31 for effecting the lock-up operation when both the governor pressure A having a magnitude indicating vehicle speed higher than a predetermined speed and the front clutch pressure B that appears only when the transmission is in a predetermined shift position or positions, are supplied thereto simultaneously.

Figure 5:
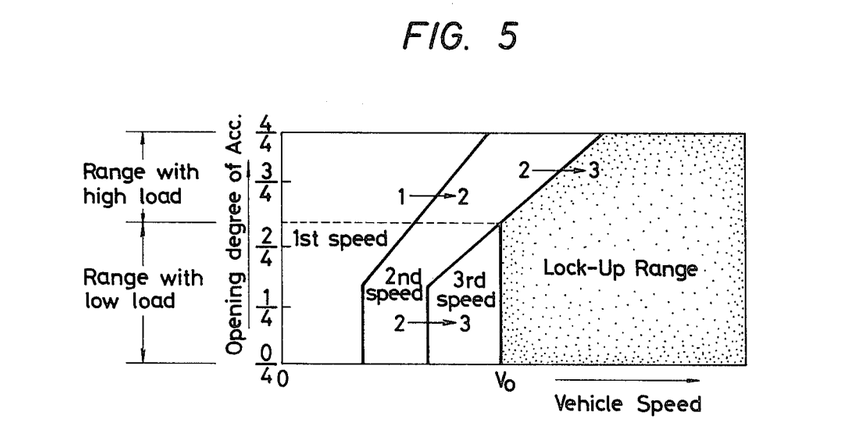
FIG. 5 is a diagrammatic representation showing the lock-up range.

FIG. 5 is a diagram showing an example of the lock-up range, wherein the lock-up operation is effected only when the driving speed exceeds Vo Km/h (for example, 40 Km/h) and the transmission is in a predetermined position or positions (for example, the third speed) and otherwise, the lock-up operation is not effected.

(1) When the vehicle speed is equal to or less than 40 Km/h:

As the governor pressure supplied to the port 35 is less than a predetermined level, the first spool 32 is pressed to the right by the spring 60 to take up the upper half position in FIG. 4 and interrupts the port 37. Consequently, even if the transmission is shifted to the third gear ratio and the front clutch pressure B is supplied to the port 36, the first spool valve 30 will not produce the operation signal G (the signal G is the front clutch pressure B itself in this case).

(2) When the transmission is not in the third gear ratio:

In this case, even if the vehicle speed exceeds 40 Km/h and a governor pressure higher than a predetermined level is supplied to the port 35 for moving the first spool 32 into the lower half position in FIG. 4, establishing communication between the ports 36 and 37, the first spool valve 30 does not produce the operation signal G because there is no supply of the front clutch pressure B to the port 36.

Thus, in the case of the above (1) or (2), that is, when the vehicle speed is less than 40 Km/h or when the transmission is not in the third gear ratio, the first spool valve 30 does not produce the pressure signal G. Accordingly, the port 43 of the second spool valve 31 is not supplied with the pressure signal G in the form of the front clutch pressure B, allowing the second spool 40 to remain in the upper half position in FIG. 4 to interrupt the port 46 and provide communication between the ports 44 and 45. Thus, under this condition, the converter operation oil H, supplied from the line pressure regulator valve 128, is permitted to flow through the ports 44 and 45 and the lock-up oil passage E to the lock-up oil chamber 27 to pressurize the latter, urging the clutch piston 20 to the right (viewing FIG. 4A). The converter operation oil flows through the passage 15 into the inside of the torque converter 1 and part of the operation oil within the torque converter 1 flows out of a gap K (see FIG. 4A) between the pump impeller 3 and turbine runner 8 into an oil chamber 63 to urge the clutch piston 20 to the left (viewing in FIG. 4A). Under this condition, since the pressure within the lock-up oil chamber 27 is equal to that within the oil chamber 63 the forces applied to the clutch piston 20 balance, and consequently the clutch facing 19 fixed on the clutch piston 20 is not pressed into frictional engagement with the converter cover 6, thereby no lock-up operation being effected. Accordingly, the converter 1 operates as usual and there is a slip between the pump impeller 3 and turbine runner 8 and the torque can be duplicated.

(3) When the vehicle speed exceeds 40 Km/h and the transmission is shifted to the third gear ratio, a governor pressure A higher than the predetermined level is supplied to the port 35, urging the first spool 32 into the lower half position in FIG. 4 providing communication between the ports 36 and 37. Then, the first spool valve 30 produces the actuation signal G (the front clutch pressure). When the actuation signal G is supplied to the port 43, the second spool 40 is urged to move to the lower half position in FIG. 4, interrupting the port 44 and providing communication between the ports 45 and 46. Thus, the oil within the lock-up oil chamber 27 is drained through the lock-up oil passage E, port 45 and port 46, decreasing the pressure within the lock-up oil chamber 27. When the pressure within the lock-up oil chamber 27 decreases, the clutch piston 20 moves to the left owing to the pressure within the oil chamber 63 and is pressed into frictional engagement with the converter cover 6 through the clutch facing 19, thereby effecting lock-up operation. Then, the pump impeller 3 and turbine runner 8 rotate integrally, thereby diminishing the power loss due to the slip between them.

If, under the condition in which the port 36 and port 37 of the first spool valve 30 are permitted to communicate with each other in response to the vehicle speed higher than the predetermined level, the front clutch pressure B, which appears upon shifting from the second speed to the third speed, is supplied to the first spool valve at its port 36, the second spool 40 moves to the left into the lower half position providing communication between the port 45 and the port 46 toward a reservoir circuit 200. Since the reservoir circuit 200 is provided with the orifice 47, a decrease in pressure within the lock-up oil chamber 27 takes place at a relatively low rate. With this arrangement, the shift shock, which otherwise would occur upon shifting in response to the supply of the front clutch pressure B if the lock-up operation has been completed, can be prevented from occurring. With this arrangement, the engagement speed of the clutch piston 20 toward the converter cover 6 is low enough as to soften the impact upon engagement of the former to the latter upon lock-up operation, so that the shock upon clutch engagement for the lock-up operation is remarkably mollified. For the lock-up release operation, the second spool valve 31 allows the communication between the ports 44 and 45, supplying the converter operation oil H to the lock-up oil chamber 27, thus urging the clutch piston 20 to the right to disengage the clutch facing 19 from the converter cover 6. In this case since the squeezing of the orifice 47 does not take effect, the lock-up release can take place smoothly and no abnormal vibration are produced upon down-shift from the third gear ratio to the second gear ratio. As is clear from the foregoing, the present invention, wherein an orifice is provided in the reservoir circuit of the lock-up control system for reducing the approaching speed of the clutch piston toward the converter cover, so as to prevent the lock-up operation until the shift has been completely finished, has succeeded in preventing the shift shock due to the shifting in the lock-up condition and the shock upon clutch engagement for the lock-up operation, improving the riding feeling, and also improving the durability of the torque converter.

Explaining the lock-up operation more in detail, within the low load driving range shown in FIG. 5, even if the vehicle speed exceeds 40 km/h, the first spool valve 30 is not supplied with the front clutch pressure B until the transmission mechanism is shifted from the second speed to the third speed, therefore no lock-up take place, that is, only when the transmission mechanism is shifted to the third gear ratio, the lock-up operation is effected. Accordingly, until the transmission mechanism is shifted from the second gear ratio to the third gear ratio, thereby effecting the lock-up operation, sufficient acceleration can be obtained by the slip of the torque converter 1, and there will be no abnormal vibration with an engine of a smaller output torque.

On the other hand, within the high load driving range in which there will be produced neither acceleration nor abnormal vibration, the vehicle speed is more than 40 km/h and the ports 36 and 37 are communicated mutually, therefore, the converting mechanism is shifted from the second gear ratio to the third gear ratio and simultaneously the port 36 is supplied with the front clutch pressure B to perform the lock-up operation, thereby preventing the power loss due to the slip of the torque converter.

The orifice 47 provided downstream the port 46 of the second spool valve 31 mollifies the clutch connection shock at the time of the lock-up operation by performing the pressure reduction in the lock-up oil pressure relatively gradually and also prevents the shift shock due to the shift in a lock-up condition by effecting the lock-up operation after the shift of the converting mechanism to the third speed is completed.

The conditions of the above-mentioned lock-up operation, as a matter of course, are that the vehicle speed is higher than 40 Km/h and that the speed of the converting mechanism can be selected appropriately as desired, not limited to the third speed. For example, with a vehicle installed with an engine of a large output torque, the lock-up operation is possible at a lower speed. A lock-up operation at the second speed is also possible, and with a transmission with four-forward-speed and one-reverse-speed, the lock-up operation can be performed at the third and fourth speeds. The above-mentioned structure is so designed as to supply the governor pressure A to the port 35 of the first spool valve assembly 30 and the front clutch pressure B to the port 36 thereof, but the contrary supply is also possible, that is, the front clutch pressure B to the port 35 and the governor pressure A to the port 36. In this case, if the spring constant of the spring 60 is modified or if the relative positions of the ports 36 and 37 with respect to the spool 32 are modified, such a structure can be employed as the lock-up control device in FIG. 4.

As is clear from the foregoing explanation, the lock-up controlling device of the present invention, which is so designed that the transmission mechanism is shifted to a predetermined shift position by means of two spool valves, and that the lock-up operation is performed only when the vehicle speed exceeds a predetermined value, has succeeded in making the lock-up control device compact, performing a constant lock-up operation under the most suitable conditions, preventing any unpleasant vibration and noise which have been produced conventionally when the lock-up operation takes place within the low load driving range, and also improving the acceleration.

What is claimed is:

1. In an automatic transmission for a vehicle, the automatic transmission having at least two forward gear ratios and including a torque converter with a lock-up mechanism including a lock-up chamber, a source of a first pressurized fluid, a passageway communicable with the source of the first pressurized fluid to be pressurized when a predetermined one of the two forward gear ratios is established, a source of a second pressurized fluid indicative of the vehicle speed, and a fluid reservoir;
   a hydraulic control system for the torque converter comprising:
   a first valve means communicating with the passageway and with the source of the second pressurized fluid;
   a second valve means communicating with the lock-up chamber and having a first inlet port;
   said first valve means being operable for establishing fluid communication between said first inlet port of said second valve means and one of
   the passageway or
   the source of the second pressurized fluid when a pressure in the other one of
   the passageway or
   the source of the second pressurized fluid is higher than a predetermined value;
   said second valve means being operable for connecting the lock-up chamber to said fluid reservoir when said fluid communication is established and the pressure in said first inlet port of said second valve means is higher than a predetermined value;
   whereby when the predetermined one of the two forward gear ratios is established and the vehicle speed is higher than a predetermined speed, the lock-up torque converter locks-up.

2. A hydraulic control system as claimed in claim 1, in which
   said first valve means includes a first inlet port communicating with the passageway;
   a second inlet port communicating with the source of second pressurized fluid;
   an outlet port communicating with said first inlet port of said second valve means; and
   a spool responsive only to the pressure of the second pressurized fluid and movable between a first position in which communication between said first inlet port and said outlet port is established and a second position in which the communication between said first inlet port and said outlet port is blocked.

3. A hydraulic control system as claimed in claim 1, in which
   said first valve means includes
   a first inlet port communicating with the source of the second pressurized fluid;
   a second inlet port communicating with the passageway;
   an outlet port communicating with said first inlet port of said second valve means; and
   a spool responsive only to the pressure in the passageway and movable between a first position in which communication between said first inlet port and second outlet port is established and a second position in which the communication between said first inlet port and second outlet port is blocked.

4. A hydraulic control system as claimed in claim 2 or 3, in which
   said second valve means includes:
   a second inlet port communicating with the source of the first pressurized fluid;
   an outlet port communicating with the lock-up chamber;
   a drain port for drainage; and
   a spool responsive only to the pressure in said inlet port of said second valve means and movable between a first position thereof in which said outlet port thereof communicates only with said drain port thereof and a second position in which said outlet port thereof communicates only with said second port thereof.

5. A hydraulic control system as claimed in claim 1, in which
   said second valve means includes:
   a second inlet port communicating with the source of the first pressurized fluid;
   an outlet port communicating with the lock-up chamber
   a drain port for drainage; and
   a pressure responsive spool movable between a first position thereof in which said outlet port thereof communicates only with said drain port thereof and a second position in which said outlet port thereof communicates only with said second inlet port thereof.

6. A hydraulic control system as claimed in claim 1, in which the predetermined one of the two forward gear ratios in the highest gear ratio of the automatic transmission.

7. A hydraulic control system for a lock-up mechanism of a torque converter for a transmission, the lock-up mechanism including a lock-up chamber and being engaged when the lock-up chamber is exhausted and disengaged when the lock-up chamber is pressurized, the hydraulic control system comprising:
   a source of fluid pressure;

means communicating with said source of fluid pressure for producing line pressure;

means communicating with said line pressure producing means for producing governor pressure indicative of a transmission output speed of the transmission;

shift valve means responsive to said governor pressure for supplying said line pressure to a predetermined passageway when a predetermined gear ratio is to be established in the transmission;

a first valve means communicating with said governor pressure producing means and with said predetermined passageway;

a second valve means for supplying said line pressure to the lock-up chamber to pressurize same to cause disengagement of the lock-up mechanism when the pressure applied thereto is lower than a predetermined value and for exhausting the lock-up chamber to allow engagement of the lock-up mechanism when the pressure applied thereto is higher than said predetermined value;

said first valve means allowing one of said predetermined passageway or said governor pressure producing means to communicate with said second valve means to apply the pressure to said second valve means when a pressure of the remaining one of said predetermined passageway or said governor pressure producing means is higher than a predetermined value.

* * * * *